UNITED STATES PATENT OFFICE 2,666,079

CYANOALKYLAMMONIUM SALTS OF PENTACHLOROPHENOL

Marion W. Harman, Nitro, W. Va., assignor to Monsanto Chemical Company, St. Louis, Mo., a corporation of Delaware No Drawing. Application May 16, 1952, Serial No. 288,342

9 Claims. (Cl. 260—465)

The present invention relates to a new class of compounds and more particularly to cyanoalkylammonium pentachlorophenates.

It has been found that cyanoalkyl substituted amines combine readily with pentachlorophenol to produce salts having unusual properties for destroying certain types of marine pests. The new products possess the general formula

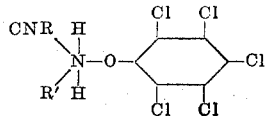

where R represents an alkylene group, as for example methylene, ethylene, propylene, and butylene and R' represents an organic substituent.

Examples of the new products which may be cited as illustrative are

Beta - methylaminopropionitrile pentachlorophenate
Beta - ethylaminopropionitrile pentachlorophenate
Beta - propylaminopropionitrile pentachlorophenate
Beta - butylaminopropionitrile pentachlorophenate
Beta - amylaminopropionitrile pentachlorophenate
Beta - hexylaminopropionitrile pentachlorophenate
Beta - octylaminopropionitrile pentachlorophenate
Beta - decylaminopropionitrile pentachlorophenate
Beta - n-dodecylaminopropionitrile pentachlorophenate
Beta - cyclohexylaminopropionitrile pentachlorophenate
Beta - allylaminopropionitrile pentachlorophenate
Beta - benzylaminopropionitrile pentachlorophenate
Butylaminoacetonitrile pentachlorophenate
Cyclohexylaminoacetonitrile pentachlorophenate
Beta-ethylamino beta-methylpropionitrile pentachlorophenate
Ethylene bis(N,N'-beta-cyanoethylamine pentachlorophenate
2-beta-cyanoethyl-2-methyl - 2,4 - diamino pentane pentachlorophenate and
Hexamethylene bis(N,N'-beta - cyanoethylamine pentachlorophenate).

Illustrative of the method of preparation are the following detailed examples.

Example 1

Substantially 56 parts by weight of 95% pentachlorophenol (substantially 0.2 molecular proportion) was dissolved in 158 parts by weight of warm alcohol. To the solution so prepared there was gradually added 20.3 parts by weight (substantially 0.2 molecular proportion) of 96.7% beta-ethylaminopropionitrile, B. P. 70–80° C./5 mm. An exothermic reaction raised the temperature of the reaction mass to 50° C. The mass was allowed to stand over night and the crystals which had separated were removed by filtration, washed with alcohol and dried. 58.7 parts by weight of beta-ethylaminopropionitrile pentachlorophenate, a cream colored product melting at 161–162° C. was obtained. It was very soluble in hot acetone, hot alcohol and hot ethyl acetate, slightly soluble in hot chloroform but very slightly soluble or insoluble in water, ether, benzene and heptane.

Example 2

To the solution of pentachlorophenol described in the foregoing example 23.8 parts by weight (substantially 0.2 molecular proportion) of beta-isopropylaminopropionitrile, 94.2%, was added. An exothermic reaction raised the temperature of the mass to 36° C. and a crystalline material separated immediately. The reaction mass was allowed to stand over night and the crystals then filtered off, washed with alcohol and dried. There was obtained 48.2 parts by weight of beta-isopropylaminopropionitrile pentachlorophenate, a colorless crystalline product, melting at 153–154° C. The product was very soluble in acetone, hot alcohol, hot ethyl acetate and hot chloroform, soluble in hot benzene, slightly soluble in hot heptane but essentially insoluble in ether and water.

Example 3

To the pentachlorophenol solution described in Example 1, 28.6 parts by weight (substantially 0.2 molecular proportion) of 88.4% N-butylaminopropionitrile was added. An exothermic reaction raised the temperature to 37° C., crystals separating from the reaction mixture. The reaction mass was permitted to stand over night and the product then filtered, washed with alcohol and dried. There was obtained 50 parts by weight of beta-n-butylaminopropionitrile pentachlorophenate, colorless crystals, melting at 152–153° C. The product was very soluble in acetone, hot alcohol, hot ethyl acetate, hot chloroform and hot benzene, slightly soluble in hot heptane but essentially insoluble in ether and water.

Example 4

Substantially 112 parts by weight (0.4 molecular proportion) of 95% pentachlorophenol was dissolved in 180 parts by weight of alcohol at about 45° C. To this solution 38.4 parts by weight (substantially 0.2 molecular proportion) of ethylene bis(N,N'-beta-cyanoethylamine) was added. The solution was then concentrated by evaporation and the crystalline residue dried. There was obtained 142.4 parts by weight of ethylene bis(N,N'-beta-cyanoethylamine pentachlorophenate) melting at 136–141° C. It was very soluble in acetone, hot alcohol, hot ethyl acetate, soluble in hot benzene and hot chloroform, slightly soluble in ether but essentially insoluble in water and heptane.

Example 5

Substantially 56 parts by weight of 95% pentachlorophenol (0.2 molecular proportion) was dissolved in 32 parts by weight of hot alcohol. To this solution there was gradually added a solution of 33.8 parts by weight (substantially 0.2 molecular proportion) of 2-beta-cyanoethyl-2-methyl-2,4-diaminopentane in substantially 8 parts by weight of alcohol. An exothermic reaction set in accompanied by formation of a mass of crystals. The reaction mixture was allowed to stand over night, the product then separated by filtration and dried. There was obtained 84.7 parts by weight of 2-beta-cyanoethyl-2-methyl-2,4-diaminopentane pentachlorophenate, cream colored solid, M. P. 168–171° C. It was soluble in hot alcohol, hot acetone, hot ethyl acetate and slightly soluble in hot benzene and chloroform but insoluble or very slightly soluble in water, ether and heptane.

Example 6

To the solution of pentachlorophenol described in Example 5 was gradually added a solution of 36.4 parts by weight (substantially 0.2 molecular proportion) of beta-tertiary octylaminopropionitrile in 32 parts by weight of alcohol. The solvent was then removed by evaporation on a steam bath and the residue heated about an hour at 100° C. There was obtained 93 parts by weight of beta-tertiary octylaminopropionitrile pentachlorophenate. It was a dark syrup which on cooling formed a soft amber resin. It was very soluble in ether, acetone, alcohol, ethyl acetate, chloroform, benzene and hot heptane but insoluble or very slightly soluble in water.

Although sodium pentachlorophenate is one of the standards employed for control of molluscacides, there is a need for more effective products. Conversion of the pentachlorophenate to the cyanoalkylamine salt greatly augments the toxicity to mollusks. This activity is illustrated by tests carried out as follows: A filter paper is placed in the bottom of a disposable container; 2 cc. of a 1:20,000 dilution of the test material is added to the filter paper. Ten snails are placed in each dish and mortality readings are made at 1, 2, 6, 24, 48, 72 and 98 hours. On the fourth day the percent kill is determined. If the material is toxic, the degree of toxicity is determined by series dilutions. Thus, the MLD–50 indicates the dilution at which 50% of the snails are killed. Therefore, if a compound kills 50% of the snails at a dilution of 1:32,000, it can be surmised that it is four times as effective as one which has an MLD–50 of 1:8,000.

| Toxicant: | MLD–50 |
|---|---|
| Sodium pentachlorophenate | 8,000 |
| 3-ethylaminopropionitrile pentachlorophenate | 25,740 |
| 3-isopropylaminopropionitrile pentachlorophenate | 30,000 |
| 3-butylaminopropionitrile pentachlorophenate | 40,000 |

It is intended to cover all changes and modifications of the examples of the invention herein chosen for purposes of disclosure which do not constitute departures from the spirit and scope of the invention.

What is claimed is:

1. A salt of pentachlorophenol and a cyanoalkylamine of the structure

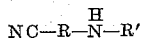

where R represents an alkylene group of less than 5 carbon atoms and R' is an organic substituent containing less than 13 carbon atoms selected from the group consisting of amino substituted alkyl groups, open chain hydrocarbon groups, alicyclic groups, aralkyl groups and

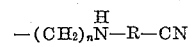

groups where R has the same significance and $n$ is an integer at least two but less than seven.

2. A salt of pentachlorophenol and a cyanoalkylamine of the structure

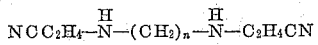

where $n$ is an integer at least two but less than seven.

3. A salt of the structure

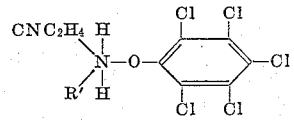

where R' is an aliphatic hydrocarbon group containing less than 13 carbon atoms.

4. A salt of the structure

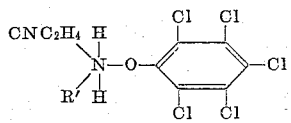

where R' is an alkyl group containing less than 13 carbon atoms.

5. Beta-tert. octylaminopropionitrile pentachlorophenate.

6. Beta-butylaminopropionitrile pentachlorophenate.

7. Beta-isopropylaminopropionitrile pentachlorophenate.

8. Beta-ethylaminopropionitrile pentachlorophenate.

9. Ethylene bis(N,N'-beta-cyanoethylamine)-pentachlorophenate.

MARION W. HARMAN.

References Cited in the file of this patent

UNITED STATES PATENTS

| Number | Name | Date |
|---|---|---|
| 1,992,615 | Hoffman et al. | Feb. 26, 1935 |
| 2,362,464 | Britton et al. | Nov. 14, 1944 |
| 2,365,056 | Coleman et al. | Dec. 12, 1944 |
| 2,464,176 | Coleman et al. | Mar. 8, 1949 |
| 2,541,961 | Gearum et al. | Feb. 13, 1951 |